Jan. 23, 1934.   E. S. MacPHERSON   1,944,441
INDEPENDENT WHEEL SUSPENSION
Filed Jan. 30, 1933   3 Sheets-Sheet 1
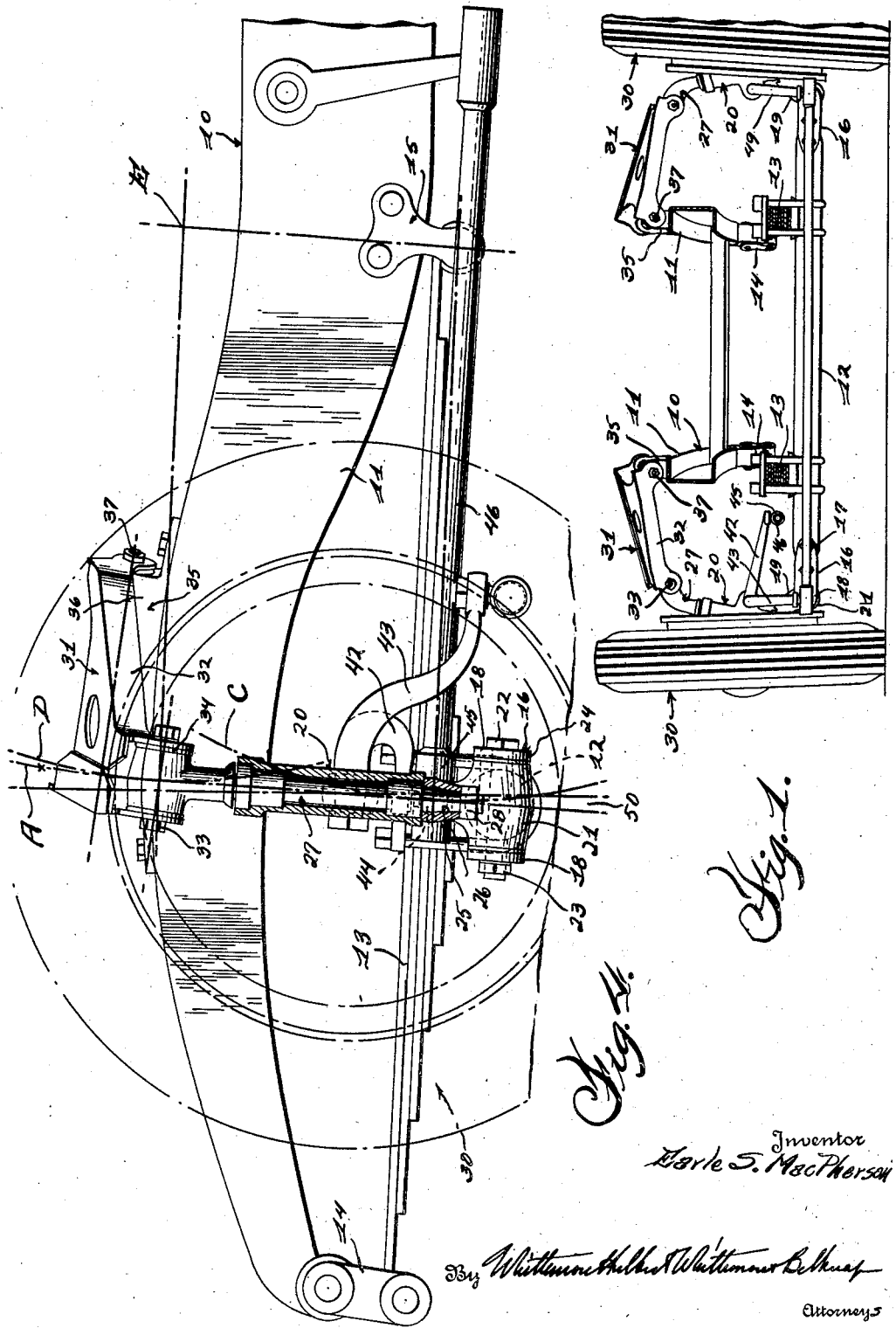

Jan. 23, 1934.   E. S. MacPHERSON   1,944,441
INDEPENDENT WHEEL SUSPENSION
Filed Jan. 30, 1933   3 Sheets-Sheet 2
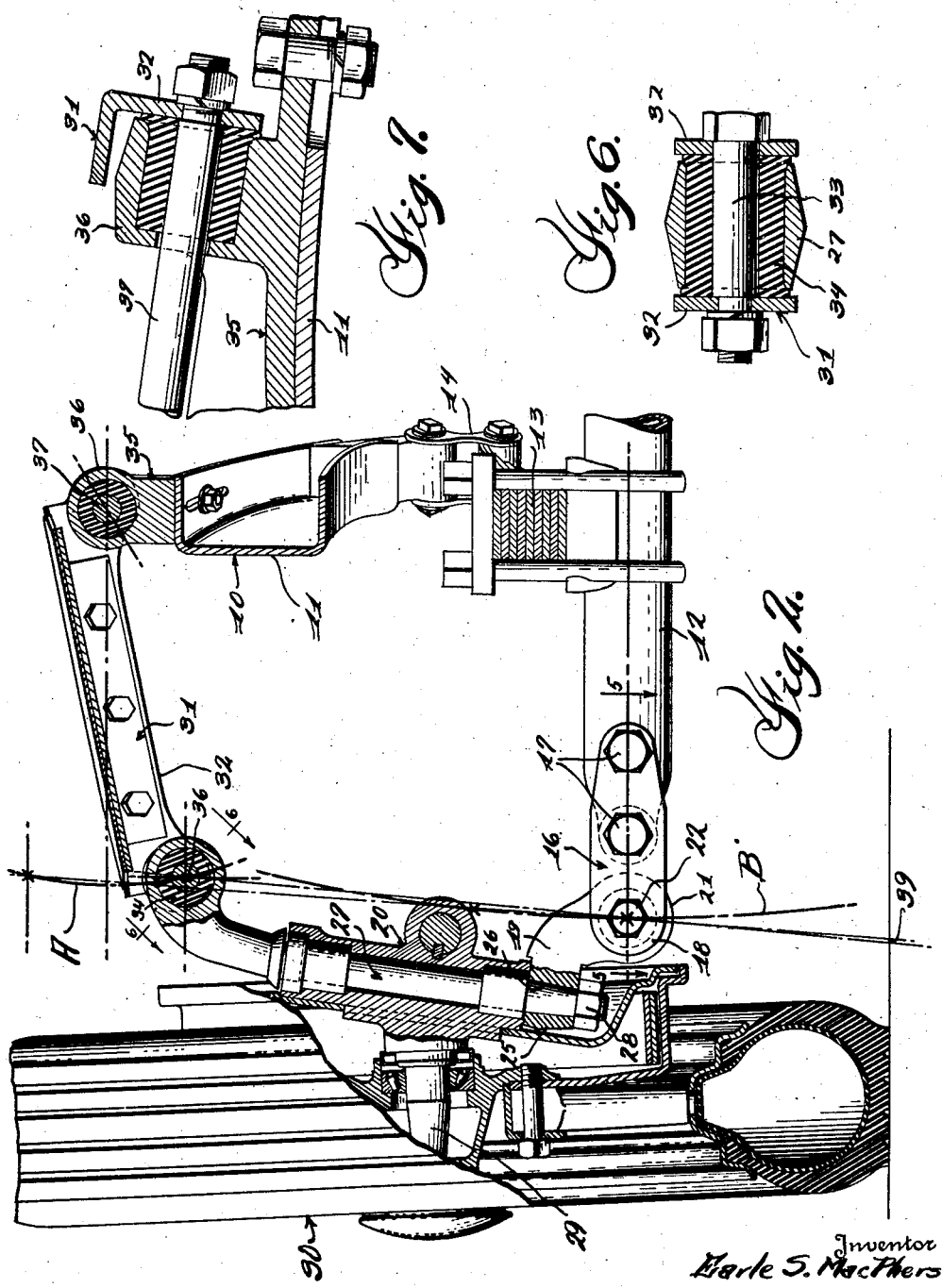
Inventor
Earle S. MacPherson Jan. 23, 1934.  E. S. MacPHERSON  1,944,441
INDEPENDENT WHEEL SUSPENSION
Filed Jan. 30, 1933  3 Sheets-Sheet 3
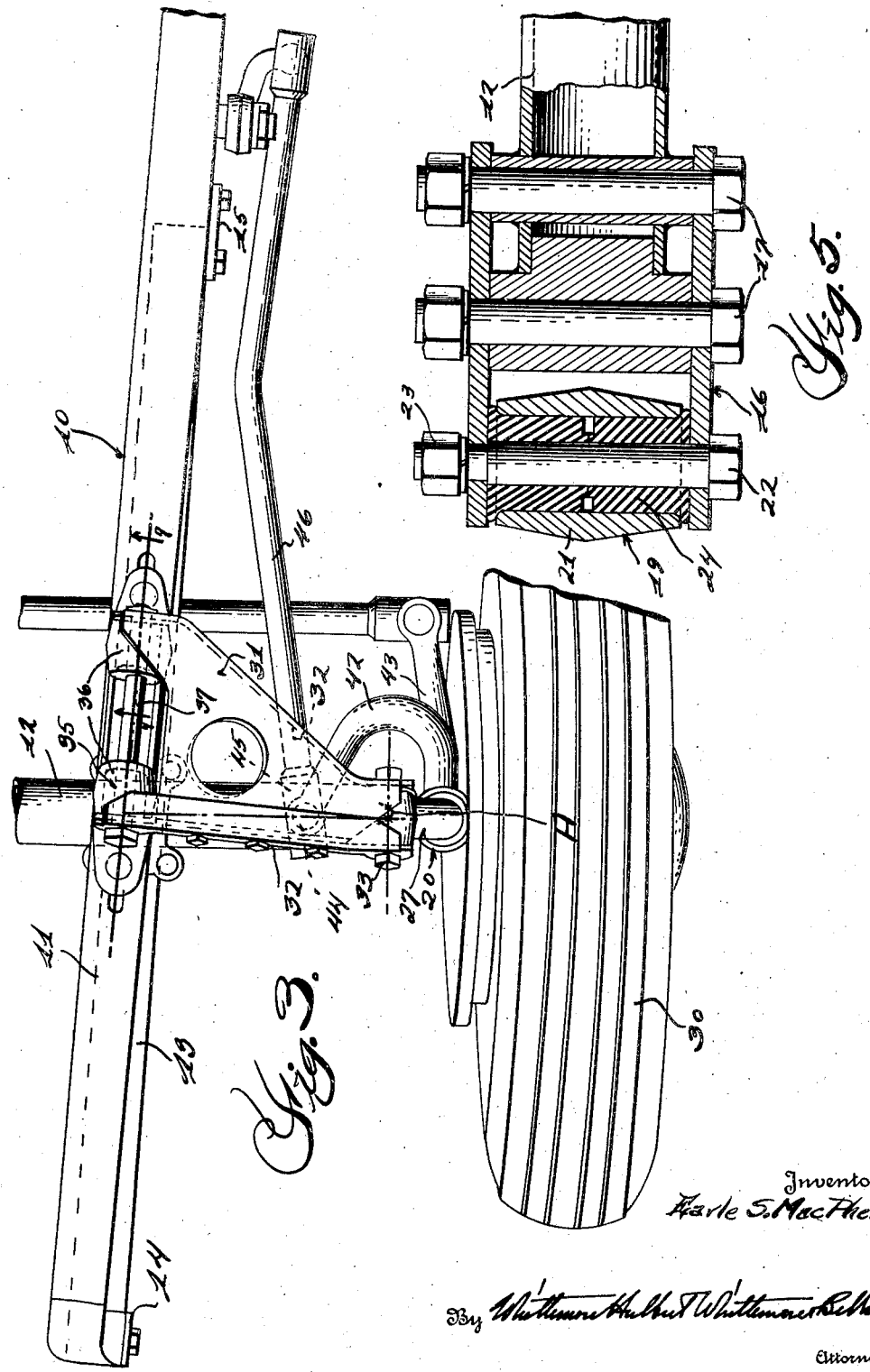

Patented Jan. 23, 1934

1,944,441

UNITED STATES PATENT OFFICE

1,944,441

INDEPENDENT WHEEL SUSPENSION

Earle S. MacPherson, Grosse Pointe Park, Mich., assignor to Hupp Motor Car Corporation, Detroit, Mich., a corporation of Virginia Application January 30, 1933. Serial No. 654,312

18 Claims. (Cl. 280—124)

This invention relates generally to motor vehicles and refers more particularly to improvements in independent wheel springing systems.

Although the principles of the invention about to be described may be employed in association with either or both the front and rear axles of a vehicle, nevertheless, the same finds particular utility when applied to the front or steering axle, since by utilizing the same in this capacity, the stability of the front end is greatly increased.

While the basic principles of independent springing are admittedly more advantageous in many respects than suspension systems of the type now universally employed, nevertheless, the same has not achieved commercial recognition in this country due perhaps to the fact that prior constructions embodying these principles were too complicated and expensive for practical installation on moderately priced vehicles. Moreover, independently sprung wheel systems of the general types heretofore devised are not sufficiently satisfactory in use to meet the requirements in this country, and one of the objections thereto which seriously affects front end stability is attributed to the inability of the wheels to maintain their normal angle of inclination upon spring deflection. Furthermore, the peculiar construction of independent wheel springing systems produced in the past necessitated the provision of specially designed steering mechanism which has not proven nearly as satisfactory as the orthodox steering system now commercially employed, and in addition rendered it extremely difficult to maintain the caster angle of the wheels to the predetermined desired quantity with the result that in prior construction, it was not uncommon for the steering wheels to wander.

The present invention contemplates obtaining all of the numerous recognized advantages incident to independent wheel springing, while at the same time eliminating the foregoing as well as other objections thereto by providing an extremely simple design resembling in appearance the orthodox front end construction insofar as the steering system and spring arrangement is concerned. In other words, this invention provides for obtaining independent front wheel suspension without modifying or otherwise interfering with the proven conventional steering systems successfully employed upon vehicles as now produced and without altering the construction or arrangement of the usual leaf springs. By reason of the foregoing, proper steering of the vehicle is not only realized, but simplicity in construction and installation is insured since the numerous articulated connections heretofore considered necessary in independent wheel springing systems are eliminated.

Another object of the present invention which contributes materially to the stability of the front end construction resides in the provision of means operable to not only maintain the caster angle to a predetermined desired quantity irrespective of spring deflection or brake application, but to also prevent diving of the steering wheels upon applying the brakes associated therewith. In the specific embodiment of the invention, the foregoing results are accomplished by preventing rocking movement of the axle upon application of the brakes associated with the wheels supported thereby.

A further object of this invention resides in carefully predetermining the geometry of the connection between the wheels and chassis so that the normal angle of inclination of the wheels with respect to the axis of the axle is substantially maintained irrespective of the degree of deflection of the wheels and so that binding or undue wear of the several parts of the system upon axle deflection is reduced to the minimum.

In addition to the above, the present invention contemplates an independent wheel springing system wherein stabilization of the chassis relative to the axle by special means is eliminated since the design incorporates the usual longitudinally extending springs which afford sufficient transverse rigidity for practical purposes.

With the foregoing as well as other objects in view, the invention resides in the simplicity of the suspension system in general which will be made more apparent as this description proceeds, especially when considered in connection with the accompanying drawings, wherein:

Figure 1 is a sectional view taken substantially on the line 1—1 of Figure 4 showing my improved suspension system;

Figure 2 is an enlarged view of one side of the assembly featured in Figure 1 with certain parts broken away for the sake of clearness;

Figure 3 is a top plan view of the construction shown in Figure 2;

Figure 4 is a side elevational view of the construction shown in Figure 2 with a number of the parts eliminated to illustrate the steering mechanism;

Figure 5 is a sectional view taken on the line 5—5 of Figure 2;

Figure 6 is a sectional view taken on the line 6—6 of Figure 2;

Figure 7 is a sectional view taken on the line 7—7 of Figure 3.

Referring now to the drawings, it will be noted that there is illustrated in Figure 1 the front end of a vehicle comprising a frame 10 having laterally spaced sill members 11 extending longitudinally of the vehicle and having a front axle 12 disposed transversely of the frame 10 beneath the same. In accordance with conventional practice, the opposite end portions of the axle 12 are connected to the sills 11 by means of leaf springs 13 extending in the direction of the sills and suitably connected at opposite ends to the latter. In detail, the front ends of the springs 13 are pivotally connected to the adjacent ends of the sills by means of shackles 14, and the rear end of the spring on the steering mechanism side of the vehicle is connected to the sill by means of a suitable anti-shimmy device designated generally herein by the reference character 15. The device 15 is so designed as to permit limited longitudinal translation of the spring relative to the frame so as to reduce front wheel shimmy to the minimum. The rear end of the spring on the opposite side of the vehicle may be directly pivotally connected to the frame in the orthodox manner.

The axle 12 may be of conventional design with the exception that the opposite ends thereof, instead of being bifurcated to receive the usual steering knuckles, are provided with brackets 16 secured thereto as at 17 and having ears 18 spaced from each other longitudinally of the vehicle. Interposed between the ears 18 for swinging movement about axes extending at right angles to the axis of the axle are the fittings 19 for supporting the steering knuckles 20. As shown particularly in Figure 5, the fittings 19 are provided with tubular portions 21 positioned between the ears 18 in concentric relation to suitable bolts 22 extending through aligned openings in the ears and secured thereto by means of the nut 23. The bolts extend transversely to the axis of the axle, and limited pivotal movement of the fittings 19 about the bolts is provided for by means of rubber bushings 24 compressed within the space between the tubular portions 21 of the fittings and the bolts 22. The fittings 19 are provided with laterally outwardly extending projections 25 having downwardly tapering openings 26 therethrough within which the lower ends of the king pins 27 are secured by means of the nuts 28. The steering knuckles 20 are suitably journaled upon the upper portions of the king pins and are provided with outwardly extending wheel spindles 29 upon which the front wheels 30 are journaled in accordance with conventional practice. As is usually the case, the king pins, and, as a consequence, the axes of the knuckles are inclined in a plane extending transversely of the vehicle so that extensions of the axes of the knuckles substantially intersect the center lines of the wheels at the points of contact of the latter with the ground. In addition, the axes of the king pins or knuckles are inclined fore and aft of the vehicle and the angle that the aforesaid axes make with the center line of the front wheels is commercially known as the caster angle. This angle is highly critical and of utmost importance in the realization of efficient steering control as will be more fully hereinafter set forth.

The extreme upper ends of the king pins 27 are operatively connected to the side sills 11 of the frame through the medium of suitable links 31 substantially triangular in plan view for reasons to be more fully hereinafter set forth. The outer ends of the links constitute the apices of the triangles and are pivotally connected to the upper ends of the king pins, while the inner ends of the links preferably form the base portions of the triangles and are pivotally connected at longitudinally spaced points to the adjacent sills 11 of the frame. In detail, the front and rear sides of the links are provided with depending reinforcing flanges 32 spaced from each other at the outer ends of the links a sufficient distance to receive therebetween the upper ends of the king pins 27. As shown particularly in Figure 6, the upper ends of the king pins 27 are tubular in shape with the axes thereof extending transverse to the axis of the king pins and are secured to the outer ends of the links 31 through the medium of bolts 33 extending through aligned openings formed in the reinforcing flanges 32 of the links. The bolts 33 extend axially through the tubular upper ends aforesaid of the king pins and are frictionally connected to the tubular portions through the medium of rubber sleeves 34 compressed into the space between the bolts and adjacent inner walls of the tubular portions. The inner ends of the links 31 are pivotally connected to the adjacent sill members 11 of the frame through the medium of brackets 35 secured to the upper sides of the sill members and having longitudinally spaced journals 36 projecting upwardly therefrom for receiving the pivot pins 37 which in turn are secured to the marginal flanges 32 at the rear ends of the links. In the present instance, accurate positioning of the outer ends of the links 31 relative to the upper ends of the king pins is effected irrespective of manufacturing inaccuracies by providing a slotted connection between the brackets 35 and sills permitting adjustment of the former longitudinally of the latter.

With the construction as thus far described, any vertical movement of one end of the axle 12 relative to the other will be largely absorbed by the spring 13 adjacent the end of the axle displaced and will not affect the normal position of the steering knuckle at the opposite end of the axle owing to the pivotal connection between the latter knuckle and axle. Although the steering knuckle associated with the end of the axle opposite the end deflected substantially maintains its normal angle of inclination with respect to the ground, the corresponding angle formed by the knuckle at the opposite or deflected end of the axle tends to change due to the difference in length of the axle and links 31. The tendency for the angle of inclination of the steering knuckles to change upon deflection of the axle will be more clearly understood upon viewing Figure 2 wherein the arc defined by the pivotal connections between the links 31 and king pins 27 upon deflection of the axle is designated by the reference character A, while the arc described by the pivotal connections between the king pins and axle is designated by the reference character B. A comparison of the two arcs will reveal that the arc A is considerably more critical than the arc B resulting in the objectionable variations in the angle of inclination of the wheels with respect to the ground upon spring deflection, and in order to reduce this variation to a negligible quantity, the bolts 33 are not only spaced as far as possible from the pins 37 by locating the latter above the sills as close to the center line of the vehicle as the construction will permit, but the bolts 33 or pivotal connections between the outer ends of the links and king pins are spaced below a horizontal plane passing through the axes of the pins 37 a distance approximating one-half the extent of normal axle deflection so that upon initial upward movement of the axle, the aforesaid pivotal connections or bolts 33 approach the vertical, and upon continued upward movement of the axle, recedes slightly from the vertical. With such an arrangement, minimum deviation of the bolts 33 from the vertical is insured upon spring deflection, and in actual practice, the extent of deviation of the bolts 33 from the vertical substantially equals the extent of deviation of the pins 22 since the latter normally lie in a common horizontal plane, and, as a consequence, move away from the vertical as the bolts 33 travel toward the latter. With this arrangement, it is apparent that notwithstanding the differences in length of the links 31 and axle, no appreciable inclination of the king pins 27 is effected upon spring deflection. Moreover, the pins 22 are positioned as close to the ground as is consistent with proper road clearance so that any side translation of the wheels at the point of contact thereof with the ground effected by variations in the angle of inclination of the king pins will be negligible. The results secured by the foregoing arrangement will be readily apparent from Figure 2 wherein the actual change in inclination of the wheels for a given degree of axle displacement is represented by the reference character 39 and is well within practical limits.

In addition to the foregoing, the present invention contemplates eliminating binding of the parts upon spring deflection by predetermining the path of travel of the pivotal connection between the outer ends of the links 31 and king pins in a fore and aft vertical plane so that the same will approximate the arc through which the axle 12 is compelled to travel about the pivotal connections between the rear ends of the springs 13 and frame. In detail, attention is directed to Figure 4 wherein the arc through which the axle travels is designated by the reference character C, and inasmuch as the king pins are fixed against swinging movement fore and aft of the chassis relative to the axle, the upper ends of the pins travel through an arc D having a radius identical to the radius of the arc C. Consequently, in order to reduce binding of the parts upon axle deflection to a minimum, the upper ends of the pins 27 must be constrained to travel in a path approximating as close as possible the arc D. The actual path of travel of the pivotal connections between the upper ends of the king pins and outer ends of the arms 31 in a vertical fore and aft plane is represented in Figure 4 by the arc A, and this arc is made to coincide as close as possible to the arc D. The above is accomplished herein by inclining the pivot pins 37 to such an extent that the axes thereof bisect the centers E of the arcs D, and by inclining the aforesaid axes inwardly toward the front end of the vehicle with respect to the center line thereof so that the axes of the pivotal connections between the outer ends of the links 31 and king pins, instead of moving at a tangent to the arc D upon spring deflection as would be the case if the pins 37 were not inwardly inclined, will travel through the arcuate path A substantially coinciding with the arc D throughout the major portion of axle deflection as shown in Figure 4.

As previously stated, the steering mechanism for turning the front wheels about the axes of the king pins 27 may be of conventional design, and, as shown herein, comprises a pair of arms 42 and 43 upon the knuckle 20 located on the steering mechanism side of the vehicle. The extremity of the arm 42 is formed with a spherical ball 44 fashioned to be received within a socket 45 fixed to the forward end of a drag link or connecting rod 46. The drag link 46 extends rearwardly from the arm 42 and is suitably operatively connected to the steering gear (not shown). As will be observed from Figure 4, the ball 44 is located directly opposite the connection of the adjacent spring 13 with the axle, and inasmuch as the springs are secured to the frame at the front ends and pivoted thereto at the rear ends, it will be seen that the arc through which the ball will move upon spring deflection will closely approximate the arc C through which the axle travels. Owing to the differences in length between the drag link and rear sections of the springs 13, the two arcs will not exactly correspond, but are sufficiently close for practical purposes. The steering wheel opposite the one to which the drag link is operatively connected is compelled to move in unison with the latter wheel by means of a link extending transversely of the vehicle and operatively connecting the free end of the lever 43 with a similar lever 49 formed on the steering knuckle associated with the first named wheel.

While the above type of steering mechanism is more or less universally employed upon vehicles as now commercially produced, nevertheless, considerable difficulty has been encountered in obtaining efficient steering control. The difficulty experienced in the past in obtaining the desired steering control is probably due to the inability of prior constructions to maintain the caster angle to a predetermined quantity and to prevent diving of the steering wheels upon spring deflection. The foregoing difficulties are greatly aggravated in the present instance by the application of brakes 60 to the steering wheels since the reaction of the brakes is transmitted directly to the steering knuckles tending to rock the latter and thereby decrease the caster angle. The caster angle of the steering wheels is commonly known as the angle of the axis of the king pins form with the vertical center lines of the steering wheels, and this angle is designated in Figure 4 by the reference character 50. It is common knowledge in the trade that the caster angle is highly critical in the realization of efficient control of the vehicle, and a relatively slight rocking movement of the axle initiated by deflection of the springs or by application of the brakes is sufficient to change this angle to such an extent as to cause either "wandering" of the steering wheels or "shimmy" of the latter. Furthermore, rocking of the axle by either or both of the above causes reacts upon the steering linkage and thereby effects a diving of the front wheels. Consequently, it is highly desirable to prevent rocking movement of the axle, and this is accomplished herein by forming the links in such a manner that they actually connect the upper end of the king pins 27 to the chassis frame at points spaced longitudinally of the latter. With the above construction, it will be noted that the only change in the caster angle upon axle deflection will depend upon the variation of the two arcs A and D since any reactive force upon the axle tending to rock the same imparted by either the springs or brakes is transmitted directly to the frame and thereby prevented from rocking the axle. Upon referring to Figure 4, it will be seen that for a substantial portion of axle deflection, the two aforesaid arcs coincide so that normally the caster angle is not affected, and in the extreme positions of the axle, the variation between the arcs is not sufficient to cause any material changes in this angle. It necessarily follows, therefore, that the present invention provides for eliminating "wandering" or "shimmy" of the wheels by maintaining the caster angle to the predetermined desired quantity, and since the foregoing construction also prevents rocking of the steering knuckles fore and aft of the vehicle, there will be no tendency for the steering wheels to dive irrespective of the location of the ball 44 relative to the axis about which the axle would tend to rock upon application of the brakes if permitted.

From the foregoing, it will be apparent that the present invention permits obtaining efficient steering control irrespective of road conditions and insures all of the numerous advantages incident to independent wheel suspension. It will further be observed that I have secured the foregoing results by a relatively simple, inexpensive construction composed of a few number of parts as compared to independent wheel suspension systems heretofore produced.

What I claim as my invention is:

1. A motor vehicle having in combination, a frame, an axle extending transversely of the frame beneath the same, springs operatively connecting opposite end portions of the axle to the frame, wheel carrying members pivotally connected at the lower ends thereof to the ends of the axle for swinging movement relative to the latter about axes extending fore and aft of the frame, and means interconnecting the upper ends of the members to the frame including links having the outer ends pivotally connected to said members and having the inner ends pivotally connected to the frame with the axes of the latter connections spaced inwardly beyond the outer sides of the frame.

2. A motor vehicle having in combination, a frame, an axle extending transversely of the frame beneath the same, springs operatively connecting opposite end portions of the axle to the frame, wheel carrying members pivotally connected to the ends of said axle for swinging movement relative thereto in a substantially vertical plane, wheels mounted upon said members, braking means associated with the wheels and members, and means interconnecting said members with the frame at points spaced longitudinally of the latter preventing rocking movement of the axle upon application of the brakes.

3. A motor vehicle having in combination, a frame, an axle extending transversely of the frame beneath the same, springs operatively connecting opposite end portions of the axle to the frame, wheel carrying members pivotally connected at the lower ends thereof to the ends of the axle for swinging movement relative to the latter about axes extending fore and aft of the frame, wheels mounted upon said members, braking means associated with the wheels and members, and means interconnecting said members with the frame preventing rocking movement of the axle upon application of the brakes and restricting vertical displacement of the wheels to a predetermined path of travel, said means including links having the outer ends pivotally connected to the upper ends of said members and having the inner ends pivotally connected to the frame at points spaced longitudinally of the latter.

4. A motor vehicle having in combination, a frame, an axle extending transversely of the frame beneath the same, springs operatively connecting opposite end portions of the axle to the frame, king pins extending upwardly from the axle having the lower ends pivotally connected to the opposite ends of the axle for swinging movement relative thereto about axes extending fore and aft of the vehicle, and means connecting the upper ends of said pins to the frame permitting the required relative movement of the pins and frame.

5. A motor vehicle having in combination, a frame, an axle extending transversely of the frame beneath the same, springs operatively connecting opposite end portions of the axle to the frame, wheel carrying members extending at a predetermined angle to the axle and pivotally connected at the lower ends thereof to the axle for swinging movement relative to the latter in a substantially vertical plane, and means connecting the upper ends of said members to the frame at points spaced longitudinally of the latter and operable to substantially maintain the predetermined angular relation aforesaid between said members and axle upon upward deflection of the latter and in addition operable to prevent rocking of the axle upon spring deflection.

6. A motor vehicle having in combination, a frame, an axle extending transversely of the frame beneath the same, springs operatively connecting opposite end portions of the axle to the frame, a king pin extending at a predetermined angle to the axle and having the lower end pivotally connected to said axle adjacent one end thereof for swinging movement relative thereto in a substantially vertical plane, a steering knuckle swivelly mounted upon the king pin, a wheel carried by the steering knuckle, and means connecting the upper end of the king pin to the frame operable to substantially maintain the predetermined angular relation aforesaid between the king pin and axle upon vertical deflection of the wheel in an upward direction.

7. A motor vehicle having in combination, a frame, an axle extending transversely of the frame beneath the same, springs operatively connecting opposite end portions of the axle to the frame, a king pin extending at a predetermined angle to the axle and having the lower end pivotally connected to said axle adjacent one end thereof for swinging movement relative thereto in a substantially vertical plane, a steering knuckle swivelly mounted upon the king pin, wheel and brake mechanism carried by the steering knuckle, and means connecting the upper end of the king pin to the frame operable to substantially maintain the predetermined angular relation aforesaid between the king pin and axle upon vertical deflection of the wheel in an upward direction and to prevent rocking movement of the axle upon application of the brake mechanism.

8. A motor vehicle having in combination, a frame, an axle extending transversely of the frame beneath the same, springs operatively connecting opposite end portions of the axle to the frame, a king pin having the lower end pivotally connected to said axle adjacent one end thereof for swinging movement relative thereto in a substantially vertical plane, a steering knuckle swivelly mounted upon the king pin, wheel and brake mechanism carried by the steering knuckle, and a link connecting the upper end of the king pin with the frame at points spaced longitudinally of the latter to prevent rocking movement of the axle upon application of the brake mechanism.

9. A motor vehicle having in combination, a frame, an axle extending transversely of the frame beneath the same, springs operatively connecting opposite end portions of the axle to the frame, wheel carrying members pivotally connected at their lower ends to the axle adjacent the opposite ends of the latter for swinging movement relative to the axle in a substantially vertical plane, and means connecting the upper ends of the wheel carrying members to the frame compelling movement of the upper ends of said members in a path closely approximating the path said ends tend to travel upon deflection of the axle.

10. A motor vehicle having in combination, a frame, an axle extending transversely of the frame beneath the same, springs operatively connecting opposite end portions of the axle to the frame, a king pin having the lower end pivotally connected to the axle adjacent one end of the latter for swinging movement relative thereto in a substantially vertical plane, a link having the outer end connected to the king pin and having the inner end pivotally connected to the frame, the axis of the pivotal connection between the link and frame being accurately predetermined with respect to the center of the arc through which the upper end of the king pin tends to travel upon spring deflection so that the actual path of travel of the pivotal connection between the outer end of the link and king pin closely approximates the aforesaid arc.

11. A motor vehicle having in combination, a frame, an axle extending transversely of the frame beneath the same, springs operatively connecting opposite end portions of the axle to the frame, wheel carrying members pivotally connected at their lower ends to the axle adjacent the opposite ends of the latter for swinging movement relative to the axle in a substantially vertical plane, and means connecting the upper end of said member with the frame operable upon spring deflection to predetermine the path of travel of the upper end of the king pin with respect to the path of travel of the axle.

12. A motor vehicle having in combination, a frame, an axle extending transversely of the frame beneath the same, springs operatively connecting opposite end portions of the axle to the frame, a king pin having the lower end pivotally connected to the axle adjacent one end of the latter for swinging movement relative thereto in a substantially vertical plane, a link having the outer end connected to the king pin and having the inner end pivotally connected to the frame, the axis of pivotal connection between the inner end of the link and frame being inclined inwardly and rearwardly with respect to the center line of the vehicle and inclined downwardly with respect to the rear spring connections with the frame to permit movement of the pivotal connection between the link and king pin in a path approximating the path the upper end of the king pin tends to travel upon vertical deflection of the axle.

13. A motor vehicle having in combination, a frame, an axle extending transversely of the frame beneath the same, springs operatively connecting opposite end portions of the axle to the frame, wheel carrying members having the lower ends pivotally connected to the axle adjacent the opposite ends thereof for swinging movement relative thereto in a substantially vertical plane, and means connecting the upper ends of the members to the frame operable upon deflection of the axle to prevent rocking movement of the members about their pivotal connections with the axle and to compel movement of the upper ends of the members in an arcuate path approximating the arcuate path of travel of the axle.

14. A motor vehicle having in combination, a frame, a tubular axle extending transversely of the frame beneath the same, springs operatively connecting opposite end portions of the axle to the frame, a king pin having the lower end pivotally connected to the axle adjacent one end thereof for swinging movement relative thereto in a substantially vertical plane, a steering knuckle swivelly mounted upon the king pin, wheel and brake mechanism carried by said knuckle, and means connecting the upper end of the king pin to the frame preventing rocking movement of the axle upon application of the brakes.

15. A motor vehicle having in combination, a frame, an axle extending transversely of the frame beneath the same, springs operatively connecting opposite end portions of the axle to the frame, a king pin having the lower end pivotally connected to the axle adjacent one end thereof for swinging movement relative thereto in a substantially vertical plane, a steering knuckle swivelly mounted upon the king pin, wheel and brake mechanism carried by said knuckle, and means connecting the upper end of the king pin to the frame at spaced points preventing rocking movement of the axle upon brake application and operable upon deflection of the axle to prevent inclination of the axis of the king pin from its normal position relative to the axle.

16. A motor vehicle having in combination, a frame, an axle extending transversely of the frame beneath the same, springs operatively connecting opposite end portions of the axle to the frame, a king pin having the lower end pivotally connected to the axle adjacent one end thereof for swinging movement relative thereto in a substantially vertical plane, a steering knuckle swivelly mounted upon the king pin, wheel and brake mechanism carried by said knuckle, and a link having the outer end pivotally connected to the upper end of the king pin and having the inner end pivotally connected to the frame at points spaced longitudinally of the latter to prevent rocking movement of the king pin upon brake application, the axis of the pivotal connection between the link and frame being accurately predetermined with respect to the center of the arm through which the axle travels upon vertical deflection so as to compel movement of the pivotal connection between the outer end of the link and king pin in an arcuate path approximating the arcuate path of travel of the axle.

17. A motor vehicle having in combination, a frame, an axle extending transversely of the frame beneath the same, springs operatively connecting opposite end portions of the axle to the frame, wheel carrying members extending at a predetermined angle to the axle and pivotally connected at their lower ends to opposite ends of said axle for swinging movement relative thereto, and a connection between the upper end of each of said members and frame preventing rocking movement of the axle.

18. A motor vehicle having in combination, a frame, an axle extending transversely of the frame, springs operatively connecting opposite ends of the axle to the frame, wheel carrying members pivotally connected at their lower ends to opposite ends of the axle, wheels mounted upon said members and brakes associated with said wheels, and a connection between the upper end of each of said members and frame compelling movement of the upper ends of the members in a path predetermined in dependence upon the path of travel of the axle and preventing rocking of the axle upon application of said brakes.

EARLE S. MacPHERSON.